(12) United States Patent
Teal

(10) Patent No.: US 7,207,762 B2
(45) Date of Patent: Apr. 24, 2007

(54) PUSH-ON SCREW-OFF ATTACHMENT DEVICE

(75) Inventor: Jimmy E. Teal, Mohnton, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/018,700

(22) Filed: Dec. 21, 2004

(65) Prior Publication Data

US 2005/0135896 A1    Jun. 23, 2005

Related U.S. Application Data

(60) Provisional application No. 60/531,946, filed on Dec. 23, 2003.

(51) Int. Cl.
*F16B 21/18* (2006.01)
*F16B 37/04* (2006.01)

(52) U.S. Cl. .................. 411/526; 411/183; 411/111; 411/113; 411/175; 411/999; 411/353; 411/533; 16/2.1

(58) Field of Classification Search ............... 411/183, 411/999, 533, 526, 353, 111, 112, 113, 174, 411/175, 520, 163; 16/2.1–2.3; D8/399
See application file for complete search history.

(56) References Cited

U.S. PATENT DOCUMENTS

| | | | | | |
|---|---|---|---|---|---|
| 1,917,852 | A | * | 7/1933 | Prez ..................... | 24/581.11 |
| 1,999,994 | A | * | 4/1935 | Jones ..................... | 24/295 |
| 2,025,686 | A | * | 12/1935 | Johnson ................. | 24/295 |
| 2,396,142 | A | * | 3/1946 | Allen .................... | 411/432 |
| 2,566,593 | A | * | 9/1951 | Bloomfield ............. | 411/520 |
| 2,567,864 | A | * | 9/1951 | Becker ................... | 411/112 |
| 2,585,728 | A | * | 2/1952 | Bedford, Jr. ........... | 411/112 |
| 2,633,174 | A | * | 3/1953 | Poupitch ................ | 411/112 |
| 2,678,075 | A | * | 5/1954 | Murphy .................. | 411/113 |
| 2,712,262 | A | * | 7/1955 | Knohl .................... | 411/521 |
| 2,724,419 | A | * | 11/1955 | Poupitch ................ | 411/113 |
| 2,975,667 | A | * | 3/1961 | Bross .................... | 411/521 |
| 3,025,897 | A | * | 3/1962 | Gieleghem .............. | 411/113 |
| 3,035,624 | A | * | 5/1962 | Jaworski ................ | 411/112 |
| 3,126,038 | A | * | 3/1964 | Jaworski ................ | 411/112 |
| 3,289,726 | A | * | 12/1966 | Sauter ................... | 411/105 |
| 4,037,418 | A | | 7/1977 | Hannan ................. | 61/45 B |
| 4,257,466 | A | | 3/1981 | Eisemann .............. | 411/371 |
| 4,780,039 | A | | 10/1988 | Hartman ................ | 411/531 |
| 4,788,807 | A | | 12/1988 | Whitman ............... | 52/410 |

(Continued)

OTHER PUBLICATIONS

McMaster-Carr catalog p. 2982 entitled Push Nuts And Retainers (undated).

*Primary Examiner*—Katherine Mitchell
(74) *Attorney, Agent, or Firm*—Robert Stearns; Dickinson Wright PLLC

(57) ABSTRACT

An attachment device for attaching a substrate to a support structure includes a housing having a space defined by facing wall portions. The space captures a rotatable push nut with flexible teeth. The housing is attached to the substrate using a flange positioned opposite one of the wall portions, the substrate being crimped between the flange and the wall portion. The device may be pushed onto a threaded stud to rapidly affix the substrate to the support structure. The push nut may be rotated within the housing to disengage it from the stud and thereby remove the substrate from the support structure.

8 Claims, 6 Drawing Sheets

U.S. PATENT DOCUMENTS

| | | | |
|---|---|---|---|
| 4,900,209 A * | 2/1990 | Reynolds | 411/432 |
| 5,073,070 A * | 12/1991 | Chang | 411/353 |
| 5,137,406 A * | 8/1992 | Cosenza | 411/113 |
| 5,380,136 A * | 1/1995 | Copple et al. | 411/183 |
| 5,399,053 A * | 3/1995 | Duran | 411/353 |
| 5,607,272 A | 3/1997 | Olvera et al. | 411/533 |
| 5,628,587 A | 5/1997 | Lesslie | 405/302.1 |
| 6,062,790 A | 5/2000 | Huang | 411/531 |
| 6,241,292 B1 | 6/2001 | Yang | 285/340 |
| 6,367,802 B1 | 4/2002 | Knapp | 277/314 |
| 6,517,124 B1 | 2/2003 | LeQuere | 285/340 |

* cited by examiner

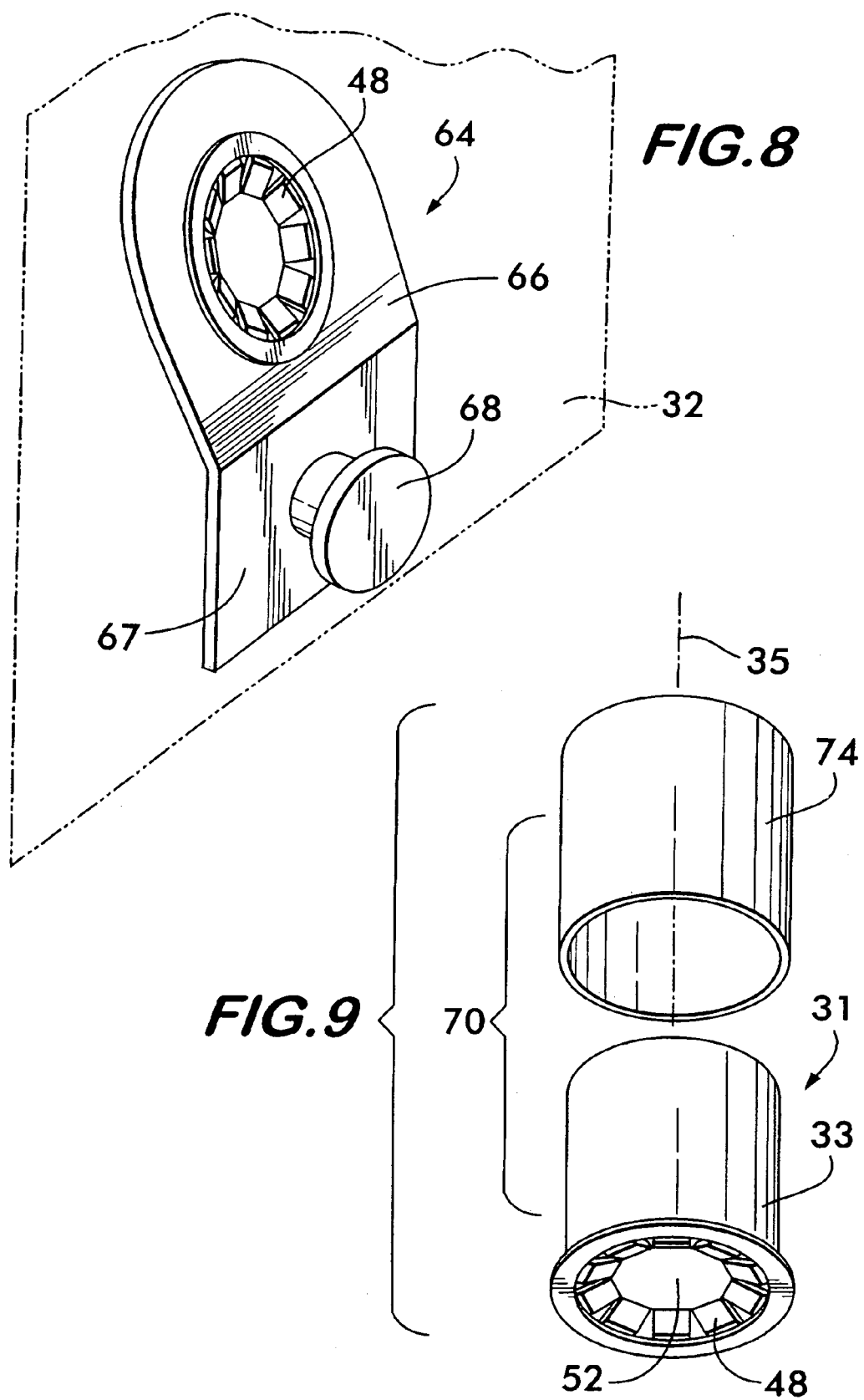

PUSH-ON SCREW-OFF ATTACHMENT DEVICE

This application claims the benefit of U.S. Provisional Patent Application No. 60/531,946 filed on Dec. 23, 2003.

FIELD OF THE INVENTION

The invention concerns fasteners for rapid attachment of panels, flexible covers and other such substrates to support structures.

BACKGROUND OF THE INVENTION

As shown in FIG. 1, access panels and protective covers 10 are often attached to supporting structure 12 using push nuts 14 that engage threaded studs 16 extending from the supporting structure. The panel or cover 10 has holes 18 which are aligned with and receive the studs 16, and the push nuts 14 are placed over the studs and engage the cover 10 to retain it to the structure 12. The push nuts have flexible teeth 20 that extend radially inwardly and engage the threads of the studs and prevent the push nut from backing off of the stud. Preferably, the teeth are flexible and angularly oriented with respect to the plane of the push nut so that they may be pushed axially onto the studs 16 in the direction that increases the orientation angle of the teeth, but cannot easily be pulled from the studs in the opposite direction. The angled teeth are thus "self jamming" and resist any axially applied force trying to remove them. Because the studs are threaded, however, the push nuts may be removed by turning them around the stud in the manner of a conventional nut.

While it is easy to install a panel or cover using push nuts, the system as it is currently practiced suffers several disadvantages. There is a high part count as there is a separate push nut for each stud. The push nuts are loose and must be handled individually, and are prone to being lost. Assembly is relatively slow, especially if there are a significant number of studs and push nuts. There is clearly a need for a device that has the advantages of the push nut for attachment but does not suffer its disadvantages.

SUMMARY OF THE INVENTION

The invention concerns an attachment device mountable on a substrate and engageable with a threaded stud for attaching the substrate to the stud. The attachment device comprises a rim surrounding and defining an opening. A plurality of flexible teeth are positioned in spaced relation around the rim and projecting inwardly. The teeth are engageable with the stud to retain the rim thereto when the stud is inserted through the opening. The rim is captured within a housing. The housing has first and second facing wall portions positioned in spaced relation to one another that define a space between them. The rim is received within the space and retained within the housing by engagement with the wall portions. The wall portions each have respective apertures that are substantially aligned with the opening defined by the rim. The apertures are sized to expose the teeth. The rim is rotatable relatively to the housing about an axis oriented substantially coaxially with the opening for removing the rim from the stud by rotating the teeth engaged with the threads.

Preferably the first and second facing wall portions are integrally formed with the housing. In a preferred embodiment the housing comprises a cylindrical shell having a longitudinal axis. The first and second facing wall portions are positioned at one end of the shell and oriented substantially perpendicularly to the axis. The apertures are substantially aligned with the axis. A flange extends outwardly from the shell and is positioned in spaced relation to the first and second wall portions. The flange engages the substrate and retains the housing to it. The substrate is captured between the flange and one of the first and second wall portions.

In another embodiment, the attachment device comprises a housing having an aperture for receiving the stud. A plurality of flexible teeth are mounted on the housing. Preferably the teeth are formed integrally with the housing. The teeth and project inwardly into the aperture, the teeth being engageable with the stud to retain the housing thereto when the stud is inserted through the aperture. A retaining flange is attached to the housing and surrounds the aperture. The retaining flange extends outwardly to define a space between the housing and the flange. The substrate is captured between the flange and the housing, but the housing is rotatable relatively to the substrate for removal thereof from the stud.

The invention also includes, in combination, a substrate having an attachment device engageable with a threaded stud for attaching the substrate to the stud. The attachment device may comprise any of the embodiments described above.

BRIEF DESCRIPTION OF THE DRAWINGS

FIGS. 8 and 9 are alternate embodiments of the attachment device according to the invention.

DETAILED DESCRIPTION OF THE EMBODIMENTS

Figure 1:
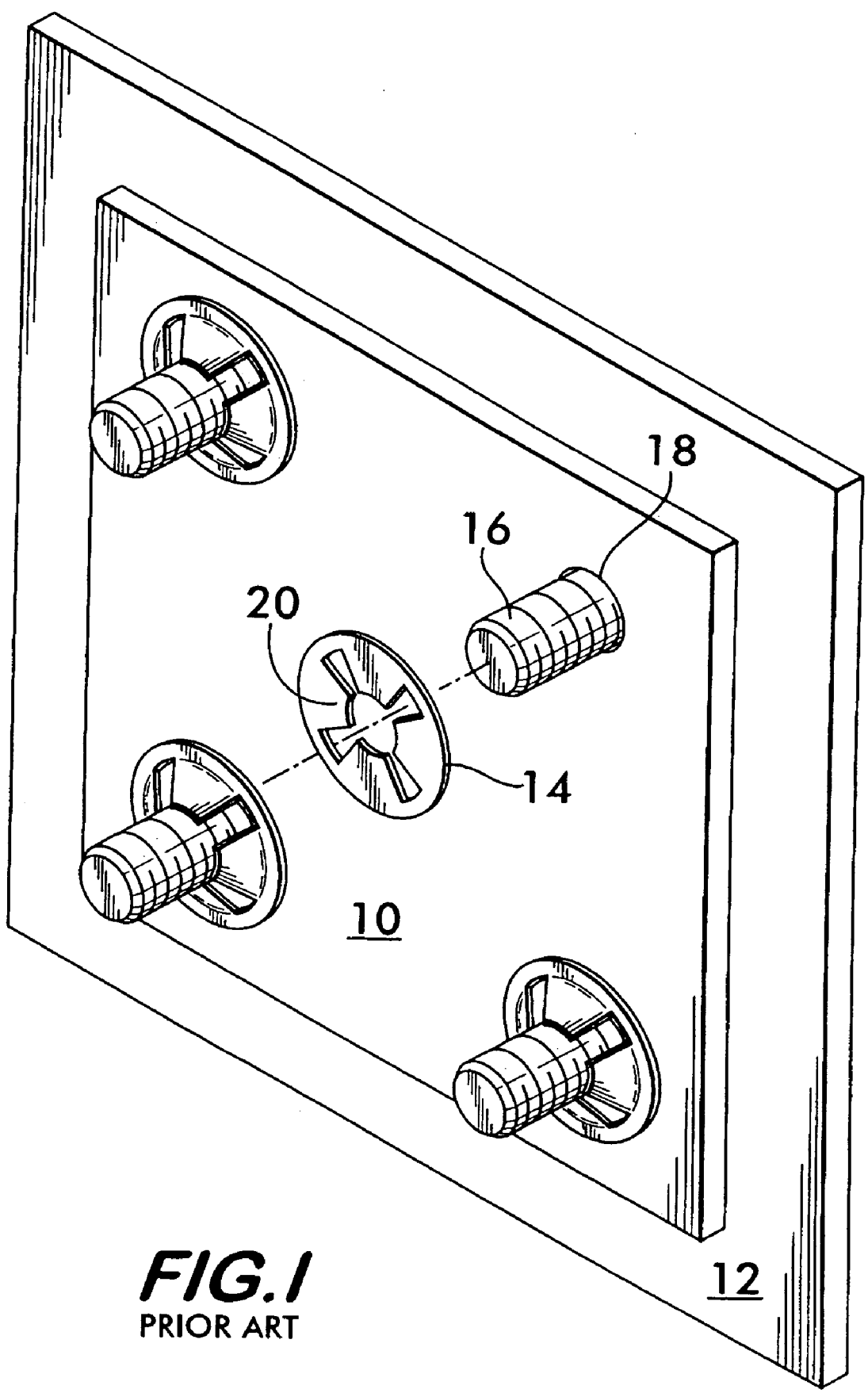
FIG. 1 is a perspective view of a cover or panel attached to a supporting structure using push nuts according to the prior art.
Figure 2:
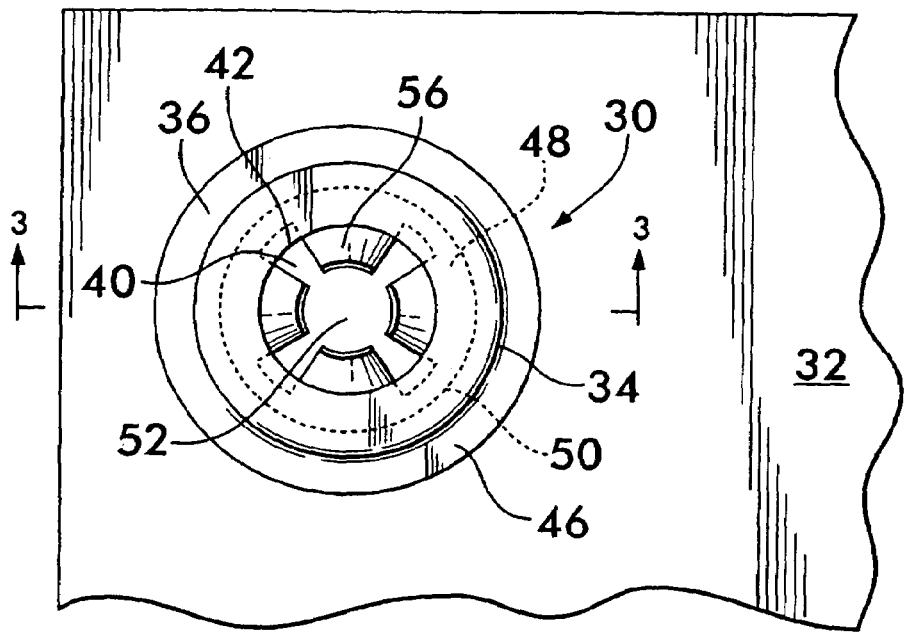
FIG. 2 is a plan view of the attachment device according to the invention.

FIG. 2 shows an attachment device 30 according to the invention mounted on a substrate 32, partially shown. Substrate 32 could be, for example, a protective cover for a sensor used in an engine compartment or an access panel, and could be a textile or polymer sheet or a plastic or metal plate. Attachment device 30 is use to releasably attach substrate 32 to a support structure by engaging threaded studs similar to the example of FIG. 1. While the attachment device works most advantageously with a threaded stud, it is by no means limited in its use to threaded studs and may be used with any manner of stud or shank.

Figure 3:
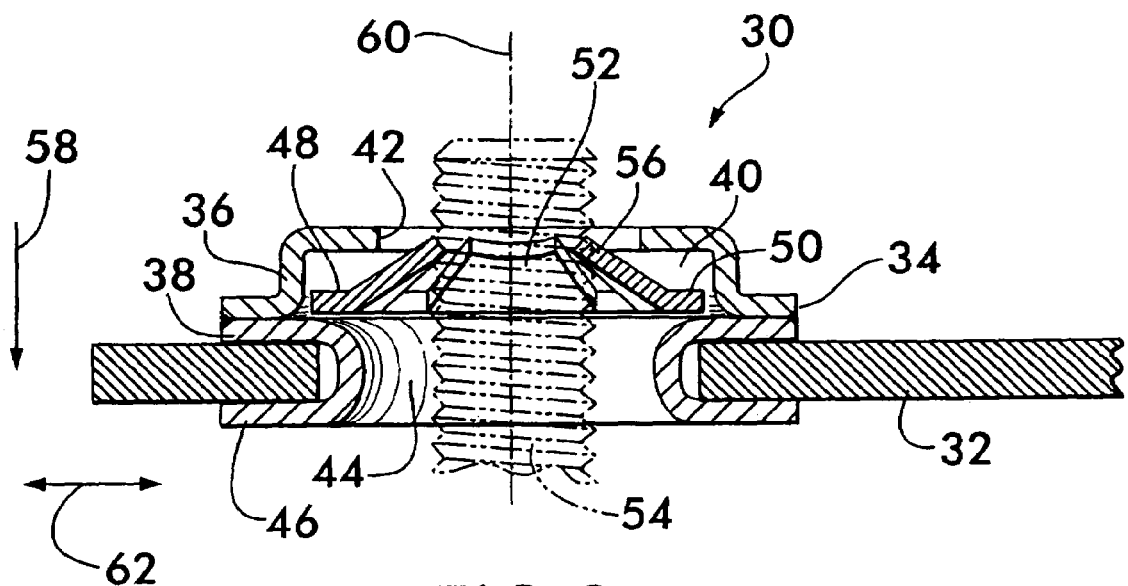
FIG. 3 is a sectional view taken at line 3—3 of FIG. 2.

As best shown in cross-section in FIG. 3, device 30 comprises a housing 34 formed of facing wall portions 36 and 38 positioned in spaced apart relation to one another to form a space 40. Each wall portion 36, 38 has a respective aperture 42, 44 through it, providing access to the space 40. Housing 34 is attached to the substrate 32, and the attachment may be effected in any number of ways. In the example shown in FIGS. 2 and 3, attachment between housing 34 and substrate 32 is effected via a flange 46 extending circumferentially around the housing in spaced relation to the wall portion 38. Flange 46 preferably comprises a rolled-over portion of the housing 34. Together, the flange 46 and wall portion 38 forcibly engage the substrate 32 to secure housing 34 to it. Alternatively, wall portion 38 may be adhesively bonded, welded or fused to the substrate 32 or fasteners such as rivets and screws may also be employed.

A push nut 48 is positioned within space 40. Push nut 48 comprises a rim 50 surrounding and defining an opening 52. Preferably, the rim is oriented within the space 40 so that its opening 52 may be substantially aligned coaxially with the apertures 42 and 44 for receiving a threaded stud 54, shown in phantom line.

As shown in FIG. 2, a plurality of teeth 56 are positioned in spaced relation around the rim 50. Teeth 56 are flexible and extend inwardly to engage the threaded stud 54 as shown in FIG. 3. Preferably, teeth 56 are angularly oriented to one side of rim 50. Teeth 56 may be angled to either side. Angularly orienting the teeth 56 allows them to be "self jamming" when engaged with the stud 54. Because the teeth 54 are flexible and angled, the push nut 48 can be pushed axially over the stud 54 in the direction indicated by arrow 58. Teeth 56 engage the stud 54 and, being flexible, deflect in the direction that increases their orientation angle as they are being pushed over the stud. Once engaged with stud 54, the angular orientation of teeth 56 resists axial force applied to the push nut 48 that would tend to remove it from the stud. Teeth 56, being too long to deflect through the rim 50 when engaged with the threaded stud 54, are placed under compression, are restrained by the rim, and jam the push nut 48 into engagement with the stud 54, preventing its removal under axial force.

Wall portions 36 and 38 and their respective apertures 42 and 44 are sized and spaced apart so that push nut 48 is captured within space 40. The space 40 is sized so that the push nut 48 can be rotated 360° relative to the housing 34 about an axis 60 that is substantially coaxial with opening 52 and apertures 42 and 44. The apertures 42 and 44 are also sized to expose at least the teeth 56 of the push nut 48. This permits access to the push nut 48 so that a tool may be used to rotate it for removal from the threaded stud 54 as one would remove a conventional nut. Preferably, the space 40 also allows lateral motion of the push nut 48 as indicated by arrow 62. By allowing lateral motion of push nut 48 within housing 34 the tolerances of the substrate 32 need not be held very closely. This will allow multiple attachment devices 30 on a substrate 32 to easily engage multiple studs 54 on a support structure without significant distortion to the cover.

Figure 3A:
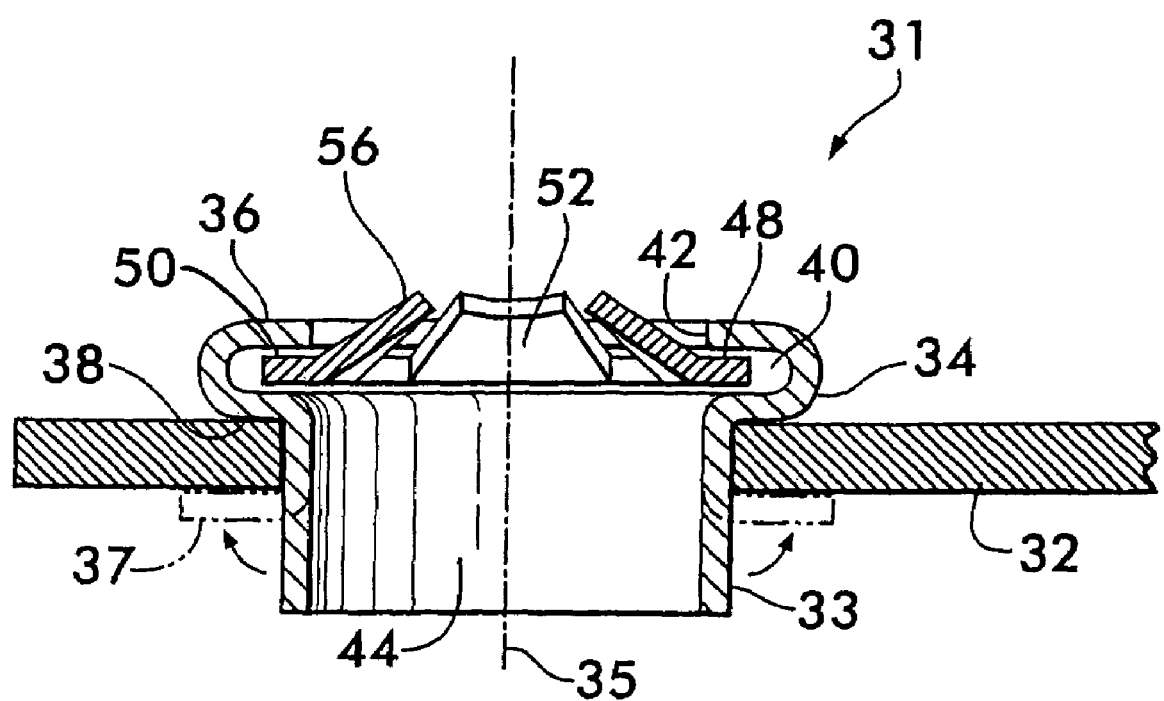
FIG. 3A is a sectional view of an alternate embodiment of an attachment device according to the invention.

A preferred embodiment 31 of the attachment device according to the invention is illustrated in FIG. 3A. In this embodiment, housing 34 comprises a cylindrical shell 33 having a longitudinal axis 35. Facing wall portions 36 and 38 are integrally formed from the shell 33 and positioned at one end. The wall portions define respective apertures 42 and 44 that are coaxially aligned with axis 35. Push nut 48 is captured within the space 40 defined by the wall portions 36 and 38, the wall portions being sized so as to expose teeth 56. A flange 37, shown in phantom line, is provided in axially spaced relation to the wall portion 38 for attaching the device 31 to the substrate 32. The flange 37 and the wall portion 38 form a channel for capturing the substrate 32. In the embodiment of the invention shown in FIG. 3A, the channel and the space 40 extend parallel to one another because the substrate 32 is flat. The substrate is captured between the flange and the wall portion. Preferably, flange 37 is formed integrally with housing 34 by deforming the end of the shell 33 to extend outwardly from the shell. Alternatively, as shown in FIG. 9, device 31 may be part of an assembly 70 comprising a tubular substrate 74. Shell 33 coaxially engages with substrate 74 and may be held thereto via a friction fit for example, or by adhesive bonding. Assembly 70 may serve, for example, as a protective cover for an elongated sensor or other delicate instrument, the protected component being received through the opening 52 along axis 35.

Figure 4:
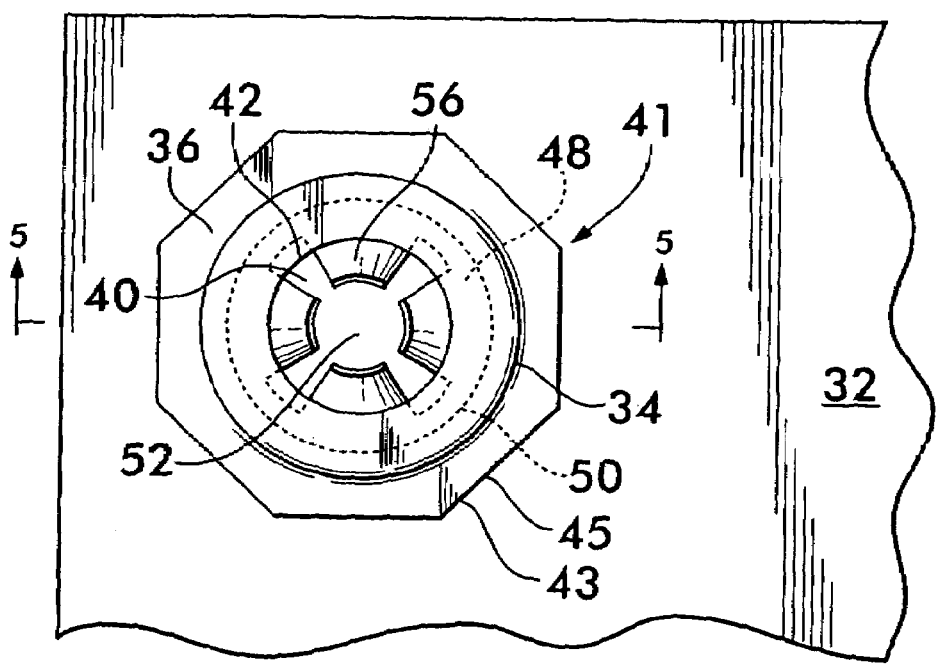
FIG. 4 is a plan view of an alternate embodiment of an attachment device according to the invention.

Another embodiment 41 of the attachment device according to the invention is shown in FIG. 4. Attachment device 41 has a perimeter 43 having a shape or surface texture that will provide purchase that will allow the device 41 to be turned relative to the substrate 32. For example, the perimeter may have a hexagonal shape to provide wrench engageable flat surfaces 45 as shown, or the perimeter 43 may be knurled so that device 41 could be manually turned. Other shapes and surface textures are also feasible.

Figure 5:
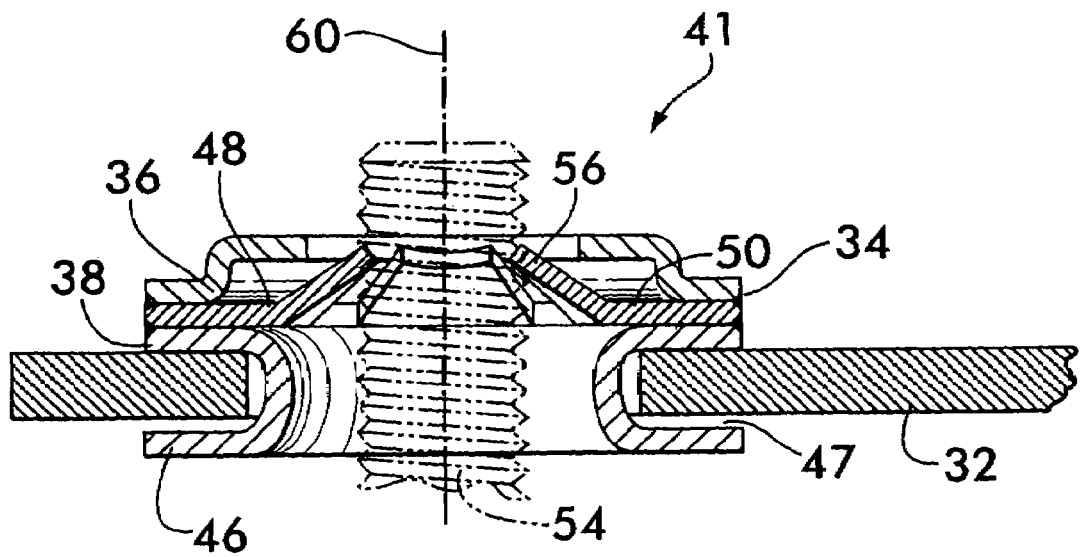
FIG. 5 is a cross-sectional view taken at line 5—5 of FIG. 4.

As shown in FIG. 5, embodiment 41 has the push nut 48 captured between facing wall portions 36 and 38 of housing 34, the wall portions engaging the rim 50 to prevent rotation of the push nut 48 relative to the housing 34. Instead, rotation of the attachment device 41 relative to the substrate 32 is permitted by positioning a gap 47 between the flange 46 and the wall portion 38, the gap 47 being wider than the thickness of substrate 32 and not permitting forcible engagement between the flange 46, wall portion 38 and substrate 32.

Substrate 32 is preferably manufactured with attachment devices 41 positioned within openings that align with studs 54 on a support structure on which the substrate 32 is to be mounted. Assembly of the substrate 32 onto the studs 54 is effected by pushing each attachment device 41 onto a respective stud 54 as described above. The attachment device 41 thus permits rapid assembly. Removal of the cover is effected by using a wrench to engage the wrench engageable surfaces 45 (see FIG. 4) and unscrew the device 41 from the stud. Torque applied to the housing 34 is transmitted to the attachment device 48 because it is secured between the facing wall portions 36 and 38. This allows teeth 56 to traverse the threads of the stud 54. However, the torque does not transfer to the substrate 32 because it does not forcibly engage flange 46 or wall portion 38 due to gap 47.

Figure 6:
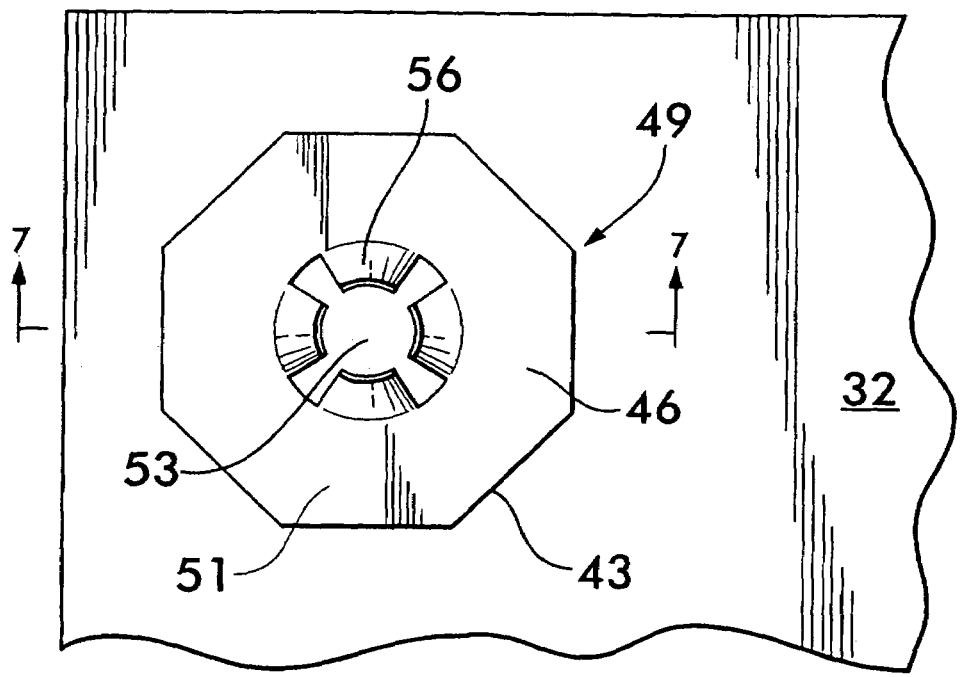
FIG. 6 is a plan view of another alternate embodiment of an attachment device according to the invention.
Figure 7:
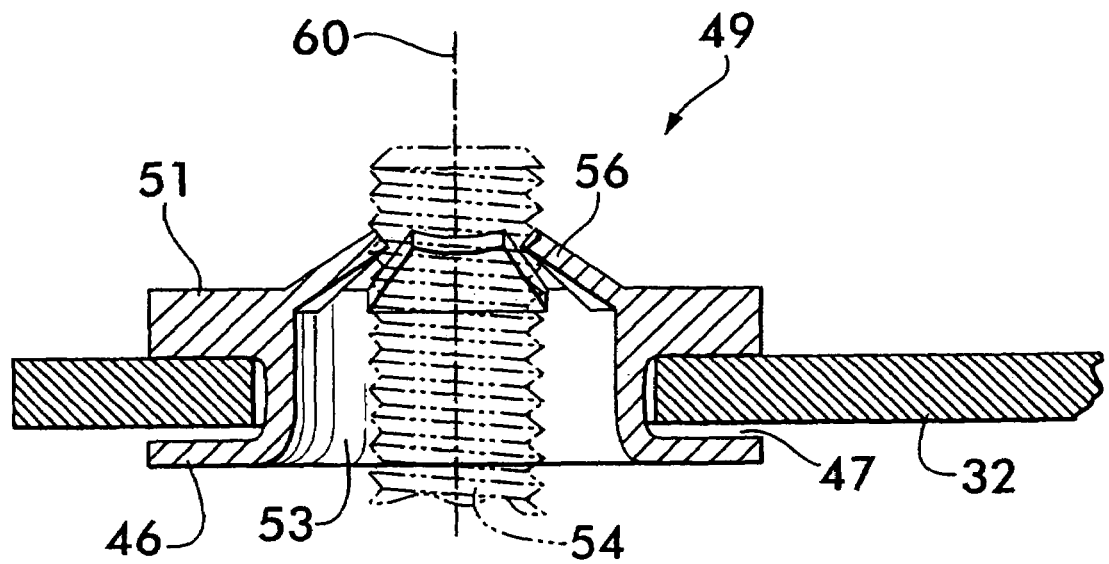
FIG. 7 is a cross-sectional view taken at line 7—7 of FIG. 6.

FIGS. 6 and 7 illustrate yet another embodiment 49 of the attachment device according to the invention. Embodiment 49 has a housing 51 formed as a single piece, the housing 51 surrounding and defining an aperture 53 that receives the stud 54. The flexible teeth 56 are attached directly to the single piece housing 51 and extend inwardly of the aperture 53 to engage the stud 54 to retain the substrate 32 to the support structure. Similar to embodiment 41 described above, attachment device 49 has a perimeter 43 shaped to provide purchase for turning the device, either by a tool such as a wrench or manually. Device 49 also has a flange 46 separated from housing 51 by a gap 47, as best shown in FIG. 7. This allows the device 49 to turn relatively to the substrate 32 to which it is attached. The attachment device 49 may be pushed directly onto the stud 54 to mount the substrate 32 on a support structure and removed by turning it relative to the substrate 32, either manually or using a tool such as a wrench.

Another embodiment 64 of the attachment device according to the invention is shown in FIG. 8. Embodiment 64 comprises a push nut 48 mounted within a housing 66, the housing being attached to a mounting plate 67. Plate 67 provides an area for attaching the housing to a substrate 32, shown in phantom line. The substrate 32 may then be attached to a support structure using attachment device 64. Various fastening means may be used to attach plate 67 to substrate 32. By way of example a rivet 68 is shown, it being understood that other fastening means, such as bolts, nails, hook-and-loop fasteners and the like could also used.

Attachment devices according to the invention offer several advantages over the prior art method of attachment, including reduced part count as there are no loose fasteners that must be handled and become lost, more rapid assembly and reduced manufacturing costs since parts can be fabricated with greater tolerances due to the relative motion afforded between the fastening components and the cover being attached to a structure.

What is claimed is:

1. An attachment device mountable on a substrate and operable to engage a threaded stud comprising:
    a housing having first and second wall portions positioned in spaced relation to one another and defining an annular space therebetween wherein each of said first and second wall portions have respective apertures therethrough;
    a channel for capturing the substrate, said channel defined between said second wall portion and a flange axially spaced from said second wall and extending radially outward with respect to said apertures; and
    a push nut disposed in said annular space and having a rim and a plurality of flexible teeth for engaging threads on the stud, said teeth positioned in spaced relation around said rim, wherein said push nut is rotatable 360° within said annular space to permit removal of said push nut from the stud without rotating said housing.

2. The attachment device of claim 1 wherein said aperture of said first wall portion is sized to expose said plurality of teeth for providing access to said plurality of teeth with a tool.

3. The attachment device of claim 1 wherein said first and second wall portions are further defined as being integrally formed with respect to one another.

4. The attachment device of claim 3 wherein said flange is further defined as being integrally formed with respect to said first and second wall portions.

5. The attachment device of claim 1 wherein said nut is further defined as being both rotatable 360° with said annular space as well as laterally movable within said annular space.

6. The attachment device of claim 1 wherein said annular space and channel are further defined as extending parallel to one another.

7. The attachment device of claim 1 wherein said first and second wall portions are further defined as being formed separately from one another and fixedly engaged with one another.

8. The attachment device of claim 7 wherein said flange is further defined as being integrally formed with respect to said second wall portion.

* * * * *

UNITED STATES PATENT AND TRADEMARK OFFICE
CERTIFICATE OF CORRECTION

| | |
|---|---|
| PATENT NO. | : 7,207,762 B2 |
| APPLICATION NO. | : 11/018700 |
| DATED | : April 24, 2007 |
| INVENTOR(S) | : Jimmy E. Teal |

Page 1 of 1

It is certified that error appears in the above-identified patent and that said Letters Patent is hereby corrected as shown below:

Column 2, line 12: "The teeth and project" should read --The teeth project--.

Column 2, line 56: "device 30 is use to" should read --device 30 is used to--.

Column 5, line 8: "and the like could also used" should read --and the like could also be used--.

Signed and Sealed this

Seventeenth Day of July, 2007

JON W. DUDAS
*Director of the United States Patent and Trademark Office*